(12) United States Patent
Chen et al.

(10) Patent No.: US 6,993,586 B2
(45) Date of Patent: Jan. 31, 2006

(54) USER INTENTION MODELING FOR WEB NAVIGATION

(75) Inventors: Zheng Chen, Beijing (CN); Xiaoming Sun, Beijing (CN); Liu Wenyin, Beijing (CN)

(73) Assignee: Microsoft Corporation, Redmond, WA (US)

(*) Notice: Subject to any disclaimer, the term of this patent is extended or adjusted under 35 U.S.C. 154(b) by 709 days.

(21) Appl. No.: 10/142,625

(22) Filed: May 9, 2002

(65) Prior Publication Data

US 2003/0212760 A1 Nov. 13, 2003

(51) Int. Cl.
*G06F 15/16* (2006.01)
*G06F 13/28* (2006.01)

(52) U.S. Cl. .................. 709/228; 709/218; 711/137

(58) Field of Classification Search ............. 709/201, 709/203, 218, 228, 238; 711/137
See application file for complete search history.

(56) References Cited

U.S. PATENT DOCUMENTS 5,774,123 A * 6/1998 Matson ............... 715/854
5,930,753 A * 7/1999 Potamianos et al. ..... 704/256.2
6,014,638 A * 1/2000 Burge et al. ............... 705/27
6,549,896 B1 * 4/2003 Candan et al. ............ 707/2
6,597,314 B1 * 7/2003 Beezer et al. ............ 715/812
2004/0128618 A1 * 7/2004 Datta ...................... 715/513
2004/0236736 A1 * 11/2004 Whitman et al. ......... 707/3
2005/0071332 A1 * 3/2005 Ortega et al. ............ 707/4

OTHER PUBLICATIONS

Zhang HongJiang, Yang Qiang, Su Zhong, "WhatNext: A Prediction System for Web Requests using N-gram Sequence Models", Jun. 2000, Microsoft Research, p. 1-15 <http://research.microsoft.com/research/pubs/view.aspx?pubid=904>.*

Sun Xiaoming, Chen Zheng, Wenyin Liu, Ma Wei-Ying, "Intention Modeling for Web Navigation", 2002, CiteSeer, p. 1-6 <http://citeseer.csail.mit.edu/chen02user.html>.*

* cited by examiner

*Primary Examiner*—Jason D Cardone
(74) *Attorney, Agent, or Firm*—Lee & Hayes, PLLC

(57) ABSTRACT

The disclosed subject matter models or predicts a user's intention during network or WWW navigation. Specifically, a statistical multi-step n-gram probability model is used to predict a user's optimal information goal. The optimal information goal is based on a sequence of previously visited network content pieces and a globally optimized navigation path through the sequence.

36 Claims, 5 Drawing Sheets

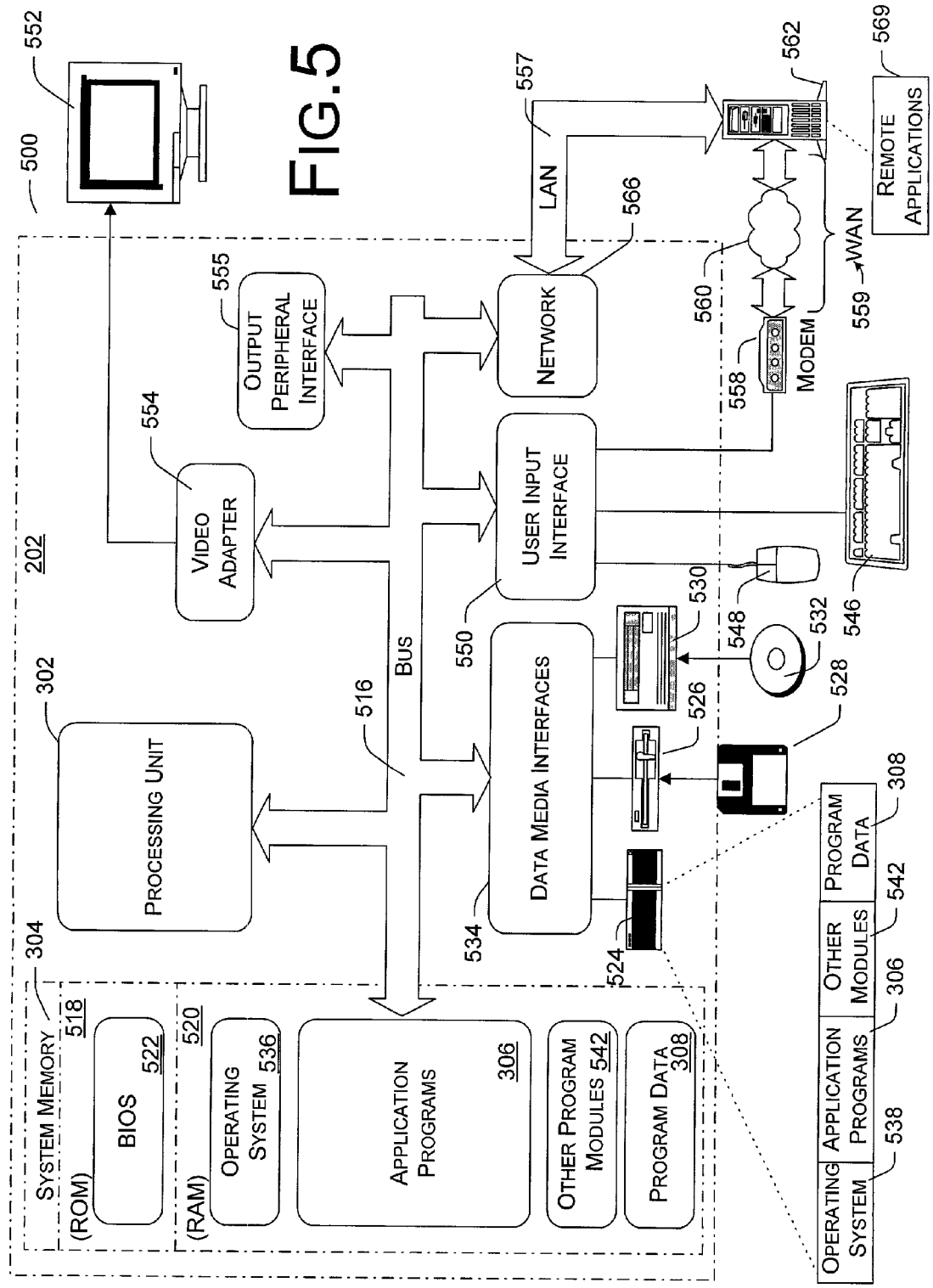

USER INTENTION MODELING FOR WEB NAVIGATION

TECHNICAL FIELD

The following description relates to navigating and accessing information on the World Wide Web (Web).

BACKGROUND

The Internet has been growing at an incredible speed. Although not all Internet servers are part of the World Wide Web (WWW), in 1999 it was reported that there were at least 9 million Web servers and 1.5 billion Web pages on the Internet. Some individuals estimated that the number of Web pages on the Internet would reach 7.7 billion by the end of the year 2001. Users surf the WWW by navigating along hyperlinks in electronic documents (e.g., a Web page) that connect various pieces of content. Unfortunately, user navigation of the rapidly growing database of information on the Internet to achieve a particular information goal can be substantially problematic.

For instance, searching for specific information in such a huge "database" as the WWW is typically a time consuming hit or miss procedure, even with the help of one or more search engines. Additionally, even though high-speed broadband networks have been deployed in many places, the time delay of information transportation on the Internet is still a serious problem. If we could predict a Web surfer's information goals (e.g., what is being sought), we might be able to improve the user's Web navigation experience by recommending related Web pages and reducing the amount of time that the user perceives as having been required to receive desired content (e.g., this is typically achieved by pre-fetching and caching Web pages that are predicted to be visited by the user).

A number of traditional user intention prediction techniques attempt to achieve such goals. Unfortunately, these conventional navigation intention prediction techniques do not typically adequately address the Web navigation problem. This is because such techniques typically only predict a single "next step" from the user's current Web location. Yet, Web surfers generally have more substantial information requirements including information goals that simply cannot be met by predicting only a single "next step" of navigation.

The following disclosed subject matter addresses these and other problems of Web navigation.

SUMMARY

The disclosed subject matter models or predicts a user's intention during network navigation. Specifically, a statistical multi-step n-gram probability model is used to predict a user's optimal information goal. The optimal information goal is based on a sequence of previously visited network content pieces and a globally optimized navigation path through the sequence.

BRIEF DESCRIPTION OF THE DRAWINGS

The same numbers are used throughout the drawings to reference like features and components.

FIG. 5 shows an example of a suitable computing environment on which an exemplary system and procedure to utilize multi-step n-gram user navigation prediction model to predict a user's optimal information goal based on probabilities and a "Web surfing history" may be implemented.

DETAILED DESCRIPTION

The following description sets forth exemplary subject matter to provide user intention modeling for Web navigation. The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Overview

Systems to help users navigate the WWW or Web are known. For instance, traditional information retrieval methods (such as TF*IDF) have been used to help a user locate information by evaluating the similarity between two documents, and applying a reinforcement learning method to a Website's structure (e.g., hyperlinks on a page). Other conventional information retrieval methods pre-fetch documents based on the assumption that the previous page sequences that a user had visited represent a Markov chain with an applied time factor. Other systems utilize a Bayesian Network to predict a user's next query using only query and trim information, assuming that a next query only depended on the previous query and the time interval—independent on other factors. Yet, other conventional systems rely on determining the longest repeating page subsequence (a path) that all users have visited, or single step n-gram language models that consider a sequence of n Web pages as an n-gram, counting the times each n-gram appears to make a prediction based on the maximal count.

The principal problem of these conventional techniques is that they typically stop at a partial or local maximal state (i.e., a single "next step" of Web navigation). Yet, users typically have more substantial information requirements or goals, which generally cannot be adequately represented by only a single next action of Web navigation from the user's current navigation state on the Web. This is because the user's ultimate information goal may involve many more actions or navigation steps to an ultimate information goal (e.g., a particular Web-based location or electronic document). The following disclosed subject matter addresses this significant problem by utilizing a multi-step n-gram prediction model to predict a globally optimized navigation path (e.g., set of Universal Resource Locations (URLs)) to the user's information intent.

Globally Optimized Navigation vs. Locally Maximized Navigation

Figure 1:
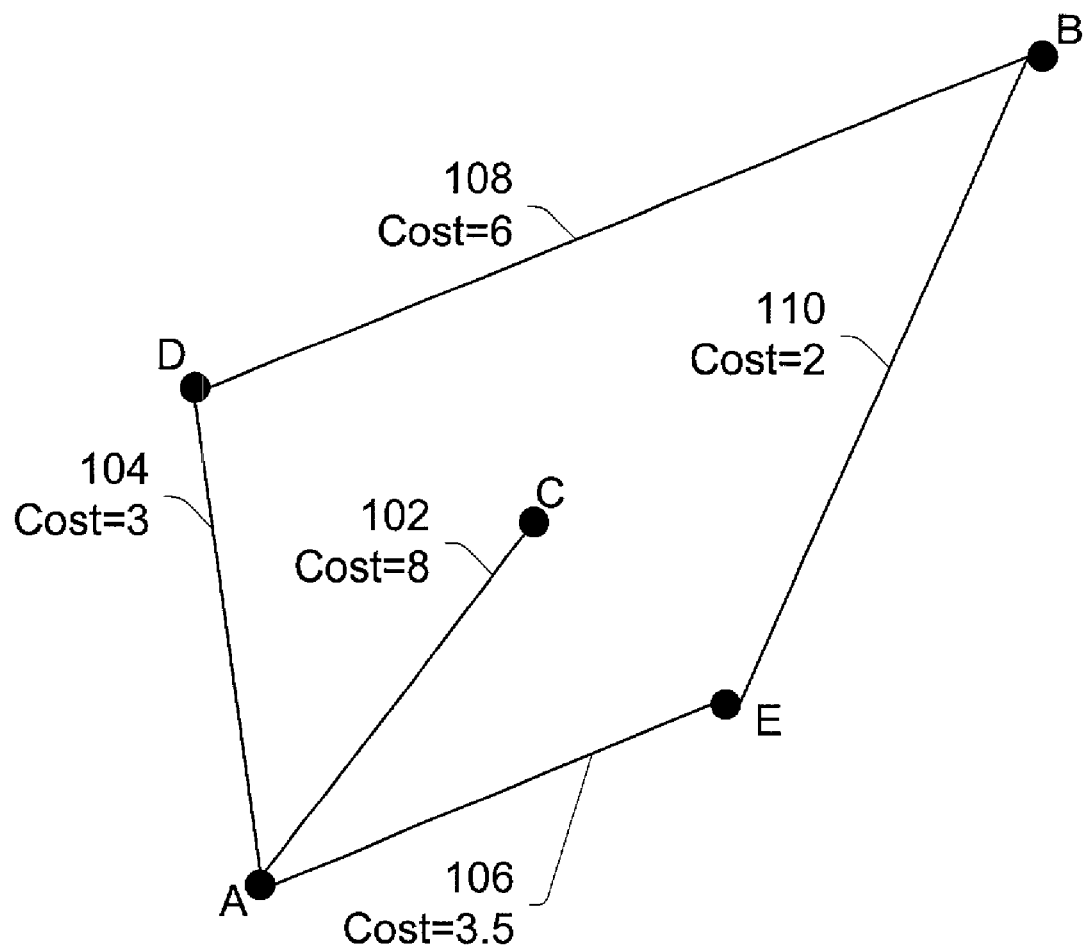
FIG. 1 is a block diagram to compare aspects of a novel exemplary globally optimized navigation prediction to a conventional locally maximized navigation prediction.

FIG. 1 is a block diagram showing a comparison of exemplary globally optimized navigation prediction to conventional locally maximized navigation prediction. To illustrate this comparison, assume that the user is at location A and assume that the user's ultimate information goal is at location B. Lines 102 through 110 represent the possible navigation paths that the user could take from location A to the ultimate information goal, B.

The path 102 from A to C represents a conventional one-step n-gram or "next step" prediction of navigation towards B. If we choose one-step prediction, then C is the best choice. But after one reaches reach point C, one will determine that goal B cannot be reached. So one-step prediction is not the global optimization method, but rather, only a local path.

There are other local paths that could also have been selected (e.g., paths 104 to E or 106 to D) based on conventional techniques (e.g., one-step n-gram predictions, or predictions based on Web page content, previous queries, mining longest repeating sequences of Web site visits, classifying a sequence of n Web pages as an n-gram to count the times each n-gram appears to make a user intention prediction based on a maximal count, and so on), but as will be described in greater detail below, merely selecting one of these locally maximized predictions from A to C, D, or even E does not take into consideration any probability that once at a particular location (e.g., C, D, or E), that the user will find it easy, natural, or even possible to continue on that particular predicted path to the ultimate information goal B.

In contrast to conventional systems, which do not take into account such probabilities, the disclosed multi-step n-gram prediction model is based on such probabilities. Specifically, a user's previous navigation history is used to calculate the various probabilities of navigation (e.g., from A) towards the user's information goal (e.g., B). To illustrate this, consider that next to each path 102 through 110 is a "cost=value" distinction to represent a probability that the user will visit a next location A through E from a different location A through E given the user's previous navigation history. The higher the cost value, the lower the probability that the user will visit the next site from the different location.

For the reasons already discussed, we know that path 102 from A to C is not a good choice to arrive at B, yet now we have additional information that tells us that the cost of visiting C from A has a cost of two (2), which represents a local optima, but not the global optima. This means that if we use one-step prediction, then C is the best answer. However, if we use multi-step prediction, C is not the best answer to reach the goal B for the reasons discussed above. Accordingly, A to C represents a locally optimal path to B, not a globally optimal path to B.

This is especially true since there is no direct history of user navigation from C to B. Looking at paths 104 and 108, or A to D to B, the relative costs three (3) and six (6) respectively add up to a cost of nine (9). Taking paths 106 and 110 into consideration, or A to E to B, the relative costs three-point-five (3.5) and two (2) respectively add up to a cost of five-point-five (5.5), less that 9. Thus multiple step navigation from A to E to B, in this example, represents the globally optimal navigation path from A to B.

To appreciate the global aspect of the foregoing example, consider that had only the next step of navigation from A to B (e.g., from A to D or from A to E) been considered, conventional user predictions techniques (at best) would have selected either D or E—with one location not necessarily being preferable over the other. However, according to the probability information provided in this disclosure, it is evident that there should be a preference over which leg of the navigation to B to select. The cost of leg A to D (3) is less that the cost of A to E (3.5). Thus, the globally best navigation solution involves taking leg A to E—a path that had a global multi-step n-gram solution not been considered, would not have been apparent.

Accordingly, and in contrast to conventional user navigation prediction techniques, the following disclosed subject matter provides a multi-step dynamic n-gram prediction model to predict an ultimate user information goal based on a globally optimized path through previous sites visited by the user.

An Exemplary System

Figure 2:
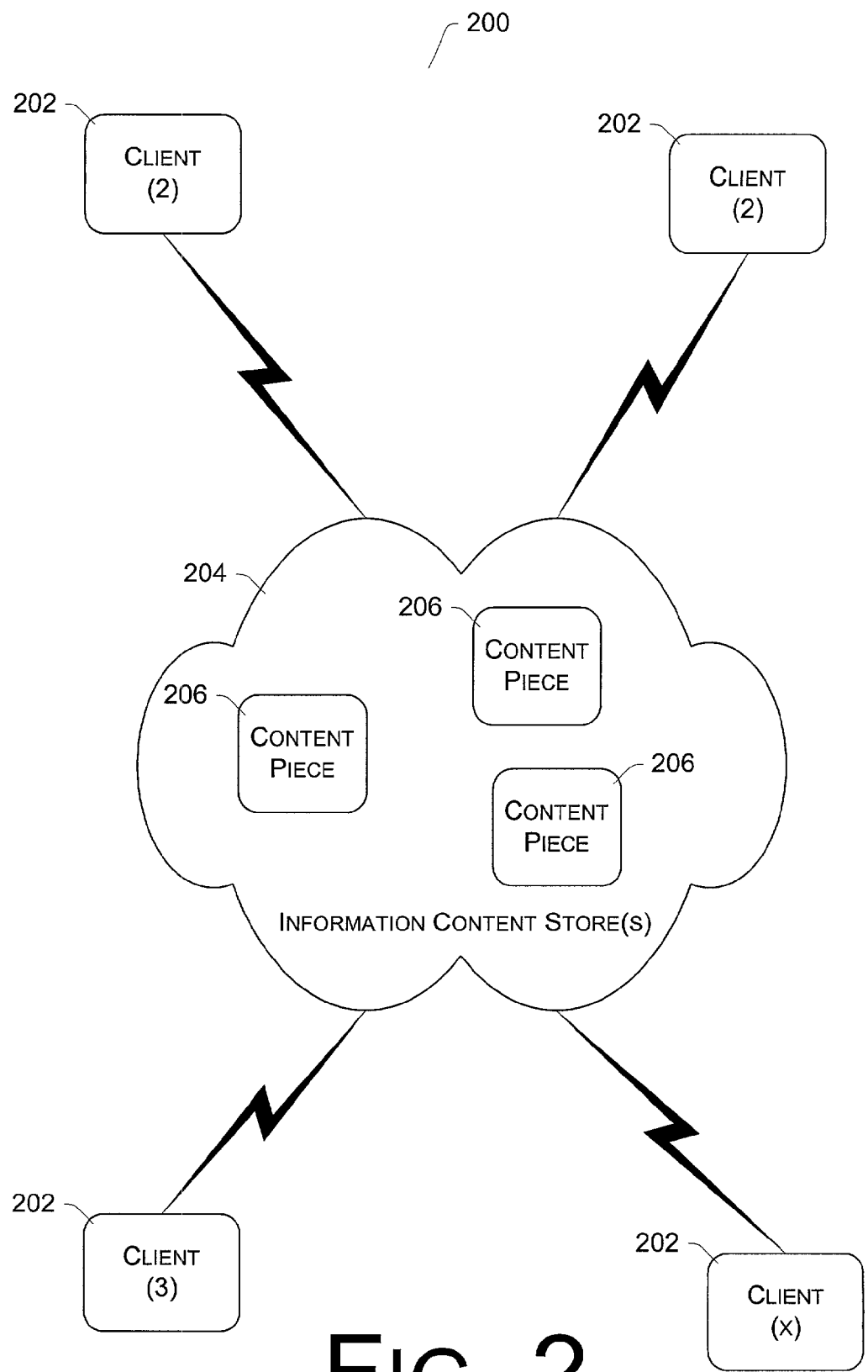
FIG. 2 illustrates an exemplary system to utilize multi-step n-gram user navigation prediction model to predict a user's optimal information goal, wherein the goal is based on a globally optimized navigation path through a sequence of previously visited network content pieces.

FIG. 2 illustrates an exemplary system 200 to utilize multi-step n-gram user navigation model to predict a users an optimal information goal based on probabilities and a Web surfing history. In system 200 one or more (x) clients 202 are coupled to an information content store 204. The information content store 204 is any combination of local storage (e.g., local volatile or non-volatile memory), networked storage (e.g., a parallel connection, an organizational intranet, the Internet, and so on), or other communication configurations.

These communication configurations provide for electronic exchange of information using an appropriate protocol (e.g., TCP/IP, UDP, SOAP, etc.) between the host device 202 and one or more information content sources or servers (not shown) that include multiple (y) pieces of information content 206. This electronic exchange provides for client 202 communication with information content store 204 to access (e.g., view, search, download, etc.) pieces of information content 206.

The storage of information content pieces 206 within information content store 204 can be arranged in any of a wide variety of manners and according to any of a wide variety of data formats. For example, information content pieces 206 may be stored on multiple servers hosting Web pages accessible via a network using an appropriate protocol such as Hypertext Transfer Protocol (HTTP). Web pages are documents that a user can view or otherwise render and which typically include links to one or more other pages that the user can access. Web pages are typically stored as one or more files at a remote location(s), being accessed by the user via a computer that is operatively coupled to a network 204. Web pages often include multiple pieces of information content 206 such still images, frames of motion video, audio, multimedia, and so on.

A user of a client 202 navigates the information content store 204 for pieces of information content 206. As a user operates within the computing environment of a client 202, the client 202 monitors the user's navigation session activities and detects the user's current session and historical navigation paths to any number of pieces of information content 206. The client 202 analyzes this globally optimized information within a statistical multi-step n-gram probability model to predict a user's optimal information goal. This multi-step n-gram prediction based on probabilities and navigation histories is dynamic, because it is performed in real-time while the user is surfing on the Web. Aspects of the statistical multi-step n-gram probability model are described in greater detail below in reference to program module 310 of FIG. 3.

A Client Computer 202

Figure 3:
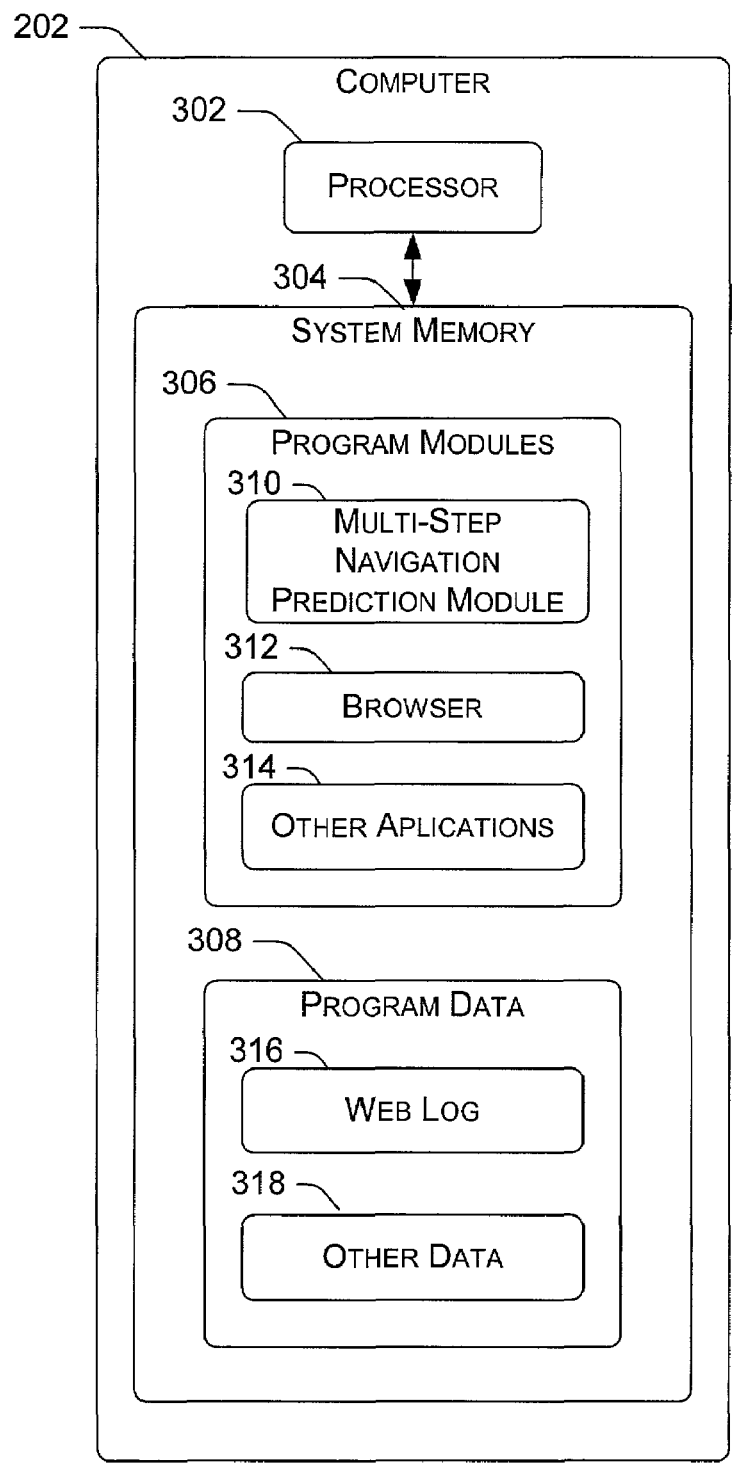
FIG. 3 shows an exemplary computing device that utilizes a multi-step dynamic n-gram prediction model to predict a user's optimal information goal, wherein the goal is based on a globally optimized navigation path through a sequence of previously visited network content pieces.

FIG. 3 shows an exemplary computing device 202 that utilizes a multi-step n-gram user navigation model to predict a user's optimal information goal based on probabilities and the user's "Web surfing history". The computer 202 is operational as any one of a number of different computing devices such as a personal computer, an image server computer, a thin client, a thick client, a hand-held or laptop device, a multiprocessor system, a microprocessor-based system, a set top box, programmable consumer electronics, a wireless phone, an application specific integrated circuit (ASIC), a network PC, minicomputer, mainframe computer, and so on.

The host computer includes a processor 302 that is coupled to a system memory 304. The system memory 304 includes any combination of volatile and non-volatile computer-readable media for reading and writing. Volatile computer-readable media includes, for example, random access memory (RAM). Non-volatile computer-readable media includes, for example, read only memory (ROM), magnetic media such as a hard disk, an optical disk drive, a floppy diskette, a flash memory card, a CD-ROM, and so on.

The processor 302 is configured to fetch and execute computer program instructions from program modules 306; and configured to fetch data 308 while executing the program modules 306. Program modules typically include routines, programs, objects, components, data structures, etc., for performing particular tasks or implementing particular abstract data types. For instance, program modules 306 include the multi-step n-gram user navigation prediction module 310, a browser module 312 such as a Web browser provided by Microsoft Corporation of Redmond, Wash., and other application modules 314. Program data includes a Web log database 316 and other data 318. We now describe exemplary aspects of these modules 306 and data 308 with respect to the operation of the client 202.

The N-Gram Model

The multi-step n-gram navigation prediction module 310 predicts a user's optimal information goal or content piece 106, wherein the goal is based on a globally optimized navigation path through a sequence of previously visited network content pieces. In this manner, it can be said that the module 310 predicts at least a subset of all of the possible locations or URLs that lie on that optimized path—the possible locations being determined from a user's prior WWW navigation history.

The substantially optimized navigation path to the user's information intention is global because it does consider other possible paths to the user's informational goal—although the module 310 may determine that certain paths are not appropriate for inclusion in the globally optimized path. The actual number of steps or paths from one location to another that comprise the globally optimized path is not only based on analysis of user navigation history to generate path probabilities, but also based on an entropy evaluation, which is discussed in greater detail below.

A user's navigation path is represented as a sequence of visited content pieces 206 or Web pages $w_1, w_2, \ldots, w_i, \ldots, w_L$, where $w_i$ is the ith visited Web page in the sequence. To estimate the probability of the navigation path, the following Bayesian rule is applied to rewrite the probability estimation as equation 2.

$$Pr(w_1, w_2, \cdots, w_i, \cdots, w_L) = Pr(w_1) \prod_{i=2}^{L} Pr(w_i | w_1, \cdots, w_{i-1}) \quad (1)$$

A statistical language model (SLM) is applied to estimate the probability $Pr(w_i | w_1, \ldots, w_{i-1})$ in equation (1).

The n-gram Markov model assumes that each word in a sequence is only determined by its previous (n−1) words. We assume that each Web page sequence with length n is called an n-gram Web page sequence. The next hyperlink the user will select is assumed dependant only on the previous (n−1) hyperlink the user has just clicked. Hence, the n-gram probability is re-written in equation (2).

$$Pr(w_i | w_1, \cdots, w_{i-1}) \approx Pr(w_i | w_{i-n+1}, \cdots, w_{i-2}, w_{i-1}) \quad (2)$$

$$= \frac{Pr(w_{i-n+1}, \ldots, w_{i-2}, w_{i-1}, w_i)}{Pr(w_{i-n+1}, \ldots, w_{i-2}, w_{i-1})}$$

$$= \frac{C(w_{i-n+1}, \ldots, w_{i-2}, w_{i-1}, w_i)/C_n}{C(w_{i-n+1}, \ldots, w_{i-2}, w_{i-1})/C_{n-1}}$$

$$= \frac{C(w_{i-n+1}, \ldots, w_{i-2}, w_{i-1}, w_i)}{C(w_{i-n+1}, \ldots, w_{i-2}, w_{i-1})} * C$$

where, $C(w_{i-n+1}, \ldots, w_{i-2}, w_{i-1}, w_i)$ denotes the count of the n-Gram $(w_{i-n+1}, \ldots, w_{i-2}, w_{i-1}, w_i)$ appearing in the training data. $C_n$ is the total number of the n-grams. $C_{n-1}$ is the total number of the (n−1)-grams. C equals to $C_n/C_{n-1}$. $C_n$, $C_{n-1}$, and C are constants. From equation (1) and (2) we know that if $C(w_{i-n+1}, \ldots, w_{i-2}, w_{i-1})$ is known, the probability of $Pr(w_i | w_1, w_2, \ldots, w_{i-1})$ is only influenced by the count $C(w_{i-n+1}, \ldots, w_{i-1}, w_i)$.

The Global Optimization Model

The objective is to predict a user's real intention or information goal based on the user's previous information navigation behavior. However, unlike conventional techniques, which just predict one step ahead towards a user's predicted objective, the multi-step navigation prediction module 310 predicts one or more steps ahead such that the ultimate Web page after several steps is the user's real intention.

For instance, suppose the user has already visited k−1 Web pages $w_1, w_2, \ldots, w_i, \ldots, w_{k-1}$, and the user's real intention is $w_L$. The aim is to find out the path $w_k, w_{k+1}, w_L$ such that the probability of the overall navigation path $Pr(w_1, w_2, \ldots, w_{k-1}, w_k, w_L)$ is maximized. This is a global optimization method or technique. The conventional one-step n-gram model assumes that the local optimization at the next step (e.g., see the local maximized path A to C discussed above in reference to FIG. 1) is the user's real intention. Thus it only chooses a wk to maximize the probability $Pr(w_1, w_2, \ldots, w_{k-1}, w_k)$ instead of the global probability—thus, it is likely to reach a local optimal point, especially when the data is not sufficient. This is similar to the "hill-climbing" algorithm and other searching algorithms often utilized in artificial intelligence (AI) algorithms.

For example, if a user likes to read news on a news Web-site but his/her favorite part of news is in always at a very deep level (e.g., the fourth level), each time the user must follow three hyperlinks to reach it. The user is not interested in all of the hyperlinks that are included in this path excepting the last one. In this case, the hyperlinks at the beginning of this path may have very small probabilities. Thus, if conventional one-step n-gram prediction is utilized, the first predicted hyperlink might take the user to a wrong way and the user may never arrive at the informational goal.

To avoid reaching the local optimal of conventional one step prediction systems, the probability of the entire path is maximized. Specifically, the global optimization is shown in equation (3).

$$\operatorname*{argmax}_{w_k} \prod_{i=k}^{\infty} Pr(w_i \mid w_1 \ldots w_{i-2} w_{i-1}) \tag{3}$$

Next, it is shown that the global optimization reflects the probability of the entire path, i.e. $Pr(w_{k+1} w_{k+2} \ldots | w_1 \ldots w_{k-1} w_k)$. The proof is shown in equation (4).

$$\prod_{i=k+1}^{L} Pr(w_i \mid w_1 \ldots w_{i-2} w_{i-1}) \tag{4}$$

$$= \prod_{i=k+1}^{L} \frac{Pr(w_1 \ldots w_{i-2} w_{i-1} w_i)}{Pr(w_1 \ldots w_{i-2} w_{i-1})}$$

$$= \frac{\prod_{i=k+1}^{L} Pr(w_1 \ldots w_{i-2} w_{i-1} w_i)}{\prod_{i=k+1}^{L} Pr(w_1 \ldots w_{i-2} w_{i-1})}$$

$$= \frac{Pr(w_1 \ldots w_{L-1} w_L)}{Pr(w_1 \ldots w_{k-1} w_k)}$$

$$= Pr(w_{k+1} \ldots w_{L-1} w_L \mid w_1 \ldots w_{k-1} w_k)$$

Hence, if L goes to infinite, the desired global optimization result is obtained. Furthermore, if the process of user navigation can be assumed to be a second-order Markov process, $Pr(w_i | w_1 \ldots w_{i-2} w_{i-1}) = Pr(w_i | w_{i-2} w_{i-1})$. Thus, equation (3) can be simplified to equation (5):

$$\operatorname*{argmax}_{w_i} \prod_{i=k+1}^{\infty} Pr(w_i \mid w_{i-2} w_{i-1}) \tag{5}$$

Although equation (5) is a simplified model, its complexity is still very high. A dynamic multi-step prediction method reduces this complexity such that i=k+1 to i=k+t, where t is a parameter representing that how many steps should be predicted forward. The parameter t is determined dynamically by employing the perplexity to measure the efficacy of the t-steps prediction. Such perplexity is used in statistical speech recognition techniques. The perplexity reflects the entropy of the path. The perplexity of t-steps prediction is defined in equation (6)

$$\frac{1}{t} \sum_{i=k+1}^{i=k+t} \log(Pr(w_i \mid w_{i-2} w_{i-1})) \tag{6}$$

Finally the user's optimal information goal is expressed in the following equation:

$$\operatorname*{argmax}_{t} \left( \frac{1}{t} \sum_{i=k+1}^{i=k+t} \log Pr(w_i \mid w_{i-2} w_{i-1}) \right) \tag{7}$$

An Exemplary Procedure

Figure 4:
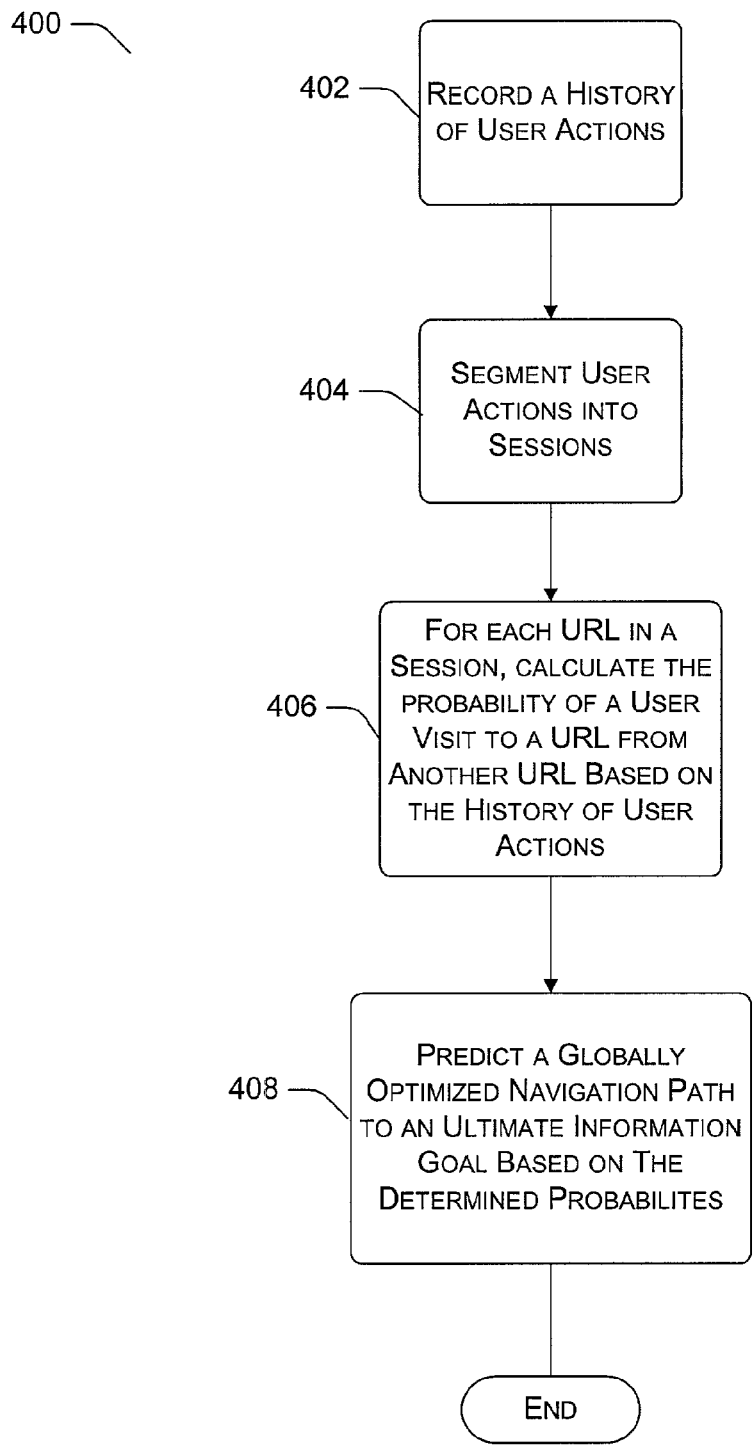
FIG. 4 shows an exemplary procedure 400 to utilize a multi-step dynamic n-gram prediction model to predict a user's optimal information goal, wherein the goal is based on a globally optimized navigation path through a sequence of previously visited network content pieces.

FIG. 4 shows an exemplary procedure 400 that utilizes a multi-step n-gram user navigation model to predict a user's optimal information goal based on probabilities and the user's "Web surfing history". At block 402, the procedure 400 records a Web log 316 indicating a user's Web navigation history. Such information can be collected by the browser 312 to automatically monitor the user's actions, for example, for the following operations.

Visits: When a user types in a URL in a browser 312 address box or choose a URL from a list (e.g., the favorite list), the browser will log the user name, start time, URL, and elapse time into the log 316.

Clicks: When a user click a hyperlink in a web-page, the browser 312 will log the user name, start time, from URL, click URL, text or image over the click URL and elapse time into the log 316.

Querys: When a user submits a query to a search engine or type in a query in a text box, the browser 312 will log the user name, start time, query site, query words, returned results, clicked results, and elapse time into the log 316.

Save As: When a user clicks a right mouse button and downloads a hyperlink or electronic image, the browser 312 will log the user name, start time and save object into the log 316.

At block 404, after generating a user log 316 (i.e., at block 402), a number of heuristic rules (e.g., based on any combination of URL, a hyperlink, a user name, a start time, text corresponding to a URL, a query, elapsed time, and/or an object name) are utilized to segment the surfing logs 316 into different sessions. Each session is represented by a list of URLs: $u_1, u_2, \ldots, u_n$.

At block 406, the procedure 400 uses the statistical n-gram model to calculate the probability that the user may visit an URL from another URL given list of URLs (i.e., represented in the user log 316). Specifically:

$$Pr(u_1, u_2, \cdots, u_n) = Pr(u_1) Pr(u_2 \mid u_1) \prod_{i=3}^{n} Pr(u_i \mid u_{i-2} u_{i-1})$$

$$Pr(u_i \mid u_{i-2} u_{i-1}) = \frac{C(u_{i-2} u_{i-1} u_i)}{C(u_{i-2} u_{i-1})}$$

Additionally, a smoothing and back-off method is applied to the calculation of $Pr(u_i|u_{i-2}, u_{i-1})$ to deal with the data sparse problem.

At block 408, the procedure 400 dynamically predicts a globally optimized navigation path based on the determined probabilities (block 406) for the user to reach an ultimate information goal. Specifically, given navigation patterns $u_1$, $u_2, \ldots, u_k$, the most possible next browsing page $u_{k+1}$ is determined, wherein $u_{k+1}$ represents the best path to meet the user's real intention based on the following:

$$\operatorname*{argmax}_{i} \prod_{i=k+1}^{\infty} Pr(u_i | u_{i-2} u_{i-1}).$$

This search can be performed by a number of techniques such as a Viterbi Beam Search. (Note, the conventional solution is to determine a local optimization according to:

$$\operatorname*{argmax}_{i} pr(u_i | u_{k-1} u_k)).$$

An Exemplary Computing Environment

FIG. 5 shows an example of a suitable computing environment 500 on which an exemplary system and procedure using a multi-step dynamic n-gram prediction model to predict a user's optimal information goal, wherein the goal is based on a globally optimized navigation path through a sequence of previously visited network content pieces may be implemented. Exemplary computing environment 500 is only one example of a suitable computing environment and is not intended to suggest any limitation as to the scope of use or functionality of an exemplary system and procedure to cluster queries. The computing environment 500 should not be interpreted as having any dependency or requirement relating to any one or combination of components illustrated in the exemplary computing environment 500.

An exemplary system and procedure to use a multi-step dynamic n-gram prediction model to predict a user's optimal information goal based on a globally optimized navigation path through a sequence of previously visited network content pieces may be described in the general context of computer-executable instructions, such as program modules, being executed by a computer. Generally, program modules include routines, programs, objects, components, data structures, etc., that perform particular tasks or implement particular abstract data types.

An exemplary system and procedure to use a multi-step dynamic n-gram prediction model to predict a user's optimal information goal based on a globally optimized navigation path through a sequence of previously visited network content pieces may also be practiced in distributed computing environments where tasks are performed by remote processing devices that are linked through a communications network. In a distributed computing environment, program modules may be located in both local and remote computer storage media including memory storage devices.

As shown in FIG. 5, the computing environment 500 includes a general-purpose computing device in the form of a computer 202 of FIGS. 2 and 3. The components of computer 202 may include, for example, one or more processors or processing units 302, a system memory 304, and a bus 516 that couples various system components including the system memory 304 to the processor 302.

Bus 516, represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 202 typically includes a variety of computer-readable media. Such media may be any available media that is accessible by the computer 202, and it includes both volatile and non-volatile media, removable and non-removable media. For example, the system memory 304 includes computer readable media in the form of volatile memory, such as random access memory (RAM) 520, and/or non-volatile memory, such as read only memory (ROM) 518. A basic input/output system (BIOS) 522, containing the basic routines that help to transfer information between elements within computer 202, such as during start-up, is stored in ROM 518. RAM 520 typically contains data 308 and/or program modules 306 that are immediately accessible to and/or presently be operated on by processor 302.

Computer 202 may further include other removable/non-removable, volatile/non-volatile computer storage media. By way of example only, FIG. 5 illustrates a hard disk drive 524 for reading from and writing to a non-removable, non-volatile magnetic media (not shown and typically called a "hard drive"), a magnetic disk drive 526 for reading from and writing to a removable, non-volatile magnetic disk 528 (e.g., a "floppy disk"), and an optical disk drive 530 for reading from or writing to a removable, non-volatile optical disk 532 such as a CD-ROM, DVD-ROM or other optical media. The hard disk drive 524, magnetic disk drive 526, and optical disk drive 530 are each connected to bus 516 by one or more interfaces 534.

The drives and their associated computer-readable media provide nonvolatile storage of computer readable instructions, data structures, program modules, and other data for computer 202. Although the exemplary environment described herein employs a hard disk, a removable magnetic disk 528 and a removable optical disk 532, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 528, optical disk 532, ROM 518, or RAM 520, including, by way of example, and not limitation, an OS 538, one or more application programs 306, other program modules 542, and program data 308. Each such OS 538, one or more application programs 306, other program modules 542, and program data 308 (or some combination thereof) may include an embodiment of an exemplary system and procedure to use a multi-step dynamic n-gram prediction model to predict a user's optimal information goal based on a globally optimized navigation path through a sequence of previously visited network content pieces.

A user may enter commands and information into computer 202 through input devices such as keyboard 546 and pointing device 548 (such as a "mouse"). Other input devices (not shown) may include a microphone, joystick, game pad, satellite dish, serial port, scanner, or the like. These and other input devices are connected to the processing unit 302 through a user input interface 550 that is coupled to bus 516, but may be connected by other interface and bus structures, such as a parallel port, game port, or a universal serial bus (USB).

A monitor 552 (e.g., the monitor 330 of FIG. 3) or other type of display device is also connected to bus 516 via an interface, such as a video adapter 554. In addition to the monitor, personal computers typically include other peripheral output devices (not shown), such as speakers and printers, which may be connected through output peripheral interface 555.

Computer 202 may operate in a networked environment using logical connections to one or more remote computers, such as a remote computer 562. Logical connections shown in FIG. 5 are a local area network (LAN) 557 and a general wide area network (WAN) 559. Such networking environments are commonplace in offices, enterprise-wide computer networks, intranets, and the Internet. Remote computer 562 may include many or all of the elements and features described herein relative to computer 202.

When used in a LAN networking environment, the computer 202 is connected to LAN 557 via network interface or adapter 566. When used in a WAN networking environment, the computer typically includes a modem 558 or other means for establishing communications over the WAN 559. The modem 558, which may be internal or external, may be connected to the system bus 516 via the user input interface 550 or other appropriate mechanism.

Depicted in FIG. 5 is a specific implementation of a WAN via the Internet. Computer 202 typically includes a modem 558 or other means for establishing communications over the Internet 560. Modem 558, which may be internal or external) is connected to bus 516 via interface 550.

In a networked environment, program modules depicted relative to the personal computer 202, or portions thereof, may be stored in a remote memory storage device. By way of example, and not limitation, FIG. 5 illustrates remote application programs 569 as residing on a memory device of remote computer 562. The network connections shown and described are exemplary and other means of establishing a communications link between the computers may be used.

Computer Readable Media

An implementation of exemplary subject matter to system and procedure using a multi-step dynamic n-gram prediction model to predict a user's optimal information goal based on a globally optimized navigation path through a sequence of previously visited network content pieces may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

The disclosed subject matter provides a novel multi-step n-gram user navigation prediction model to predict a user's optimal information goal based on a globally optimized navigation path through a sequence of previously visited network content pieces. Although the described subject matter has been described in language specific to structural features and methodological operations, it is understood that the arrangements and procedures as defined the appended claims are not necessarily limited to the specific features or operations described. Rather, the specific features and operations disclosed are preferred forms of implementing the claimed subject matter.

The invention claimed is:

1. A method for modeling a user intention during network navigation, the method comprising:

predicting, based on a statistical multi-step n-gram probability model, an optimal information goal of the user, the optimal information goal being based on a sequence of previously visited network content pieces and a globally optimized navigation path through the sequence, the optimal information goal being predicted as follows:

recording a history of user action, the history comprising information corresponding to user navigation to a plurality of networked content pieces, the information indicating at least the sequence of previously visited network content pieces;

for at least a portion of the sequence data, calculating respective probabilities that a user would visit a particular content piece n in the sequence from a content piece n−1 in the sequence, a prediction of the optimal information goal being based on the respective probabilities, the calculating comprising:

$$Pr(w_i|w_1, \Lambda, w_{i-1}) \approx Pr(w_i | w_{i-n+1}, \ldots, w_{i-2}, w_{i-1})$$

$$= \frac{Pr(w_{i-n+1}, \ldots, w_{i-2}, w_{i-1}, w_i)}{Pr(w_{i-n+1}, \ldots, w_{i-2}, w_{i-1})}$$

$$= \frac{C(w_{i-n+1}, \ldots, w_{i-2}, w_{i-1}, w_i)/C_n}{C(w_{i-n+1}, \ldots, w_{i-2}, w_{i-1})/C_{n-1}}$$

$$= \frac{C(w_{i-n+1}, \ldots, w_{i-2}, w_{i-1}, w_i)}{C(w_{i-n+1}, \ldots, w_{i-2}, w_{i-1})} * C;$$

wherein Pr represents the probability;

wherein user navigation to the plurality of networked content pieces is represented as $w_1, w_2, \Lambda, w_i, \Lambda, w_L$, where $w_i$ is the ith visited content piece in the sequence; and wherein $C(w_{i-n+1}, \ldots, w_{i-2}, w_{i-1}w_i)$ denotes the count of an n-Gram $(w_{i-n+1}, \ldots, w_{i-2}, w_{i-1}, w_i)$ appearing in training data, $C_n$ is a total number of the n-grams, $C_{n-1}$ is a total number of the (n−1)-grams, C equals to $C_n/C_{n-1}$, $C_n$, $C_{n-}$, and C are constants.

2. The method of claim 1, wherein a content piece of the sequence comprises a Web page.

3. The method of claim 1, wherein predicting the globally optimized navigation path is dynamically performed responsive to user Web navigation.

4. The method of claim 1, wherein the portion comprises a session of user access to particular ones of the networked content pieces.

5. The method of claim 1, wherein the history further comprises a URL, a hyperlink, a user name, a start time, text corresponding to a URL, a query, elapsed time, or an object name.

6. The method of claim 1, wherein the globally optimized navigation path is based on the following:

$$\operatorname*{argmax}_{w_i} \prod_{i=k+1}^{\infty} Pr(w_i \mid w_{i-2} w_{i-1}); \text{ and,}$$

wherein k represents a number of networked content pieces that the user has already visited.

7. The method of claim 1, wherein the globally optimized navigation path is based on the following:

$$\frac{1}{t} \sum_{i=k+1}^{i=k+t} \log(Pr(w_i \mid w_{i-2} w_{i-1}));$$

wherein k represents a number of networked content pieces that the user has already visited; and wherein t indicates how many steps are predicted.

8. The method of claim 7 further comprising dynamically determining how many steps to the optimal information goal are to be predicted by employing a perplexity that reflects the entropy of the globally optimized navigation path.

9. The method of claim 7, wherein the optimal information goal is determined according to the following:

$$\operatorname*{argmax}_{t} \left( \frac{1}{t} \sum_{i=k+1}^{i=k+t} \log Pr(w_i \mid w_{i-2} w_{i-1}) \right).$$

10. A computer-readable medium for modeling a user intention during network navigation, the computer-readable medium comprising computer-executable instructions for:
    predicting, based on a statistical multi-step n-gram probability model, an optimal information goal of the user, the optimal information goal being based on a sequence of previously visited network content pieces and a globally optimized navigation path through the sequence, the optimal information goal being predicted as follows:
    recording a history of user action, the history comprising information corresponding to user navigation to a plurality of networked content pieces, the information indicating at least the sequence of previously visited network content pieces;
    for at least a portion of the sequence data, calculating respective probabilities that a user would visit a particular content piece n in the sequence from a content piece n−1 in the sequence, a prediction of the optimal information goal being based on the respective probabilities, the calculating comprising:

$$Pr(w_i \mid w_1, \Lambda, w_{i-1}) \approx Pr(w_i \mid w_{i-n+1}, \ldots, w_{i-2}, w_{i-1})$$
$$= \frac{Pr(w_{i-n+1}, \ldots, w_{i-2}, w_{i-1}, w_i)}{Pr(w_{i-n+1}, \ldots, w_{i-2}, w_{i-1})}$$
$$= \frac{C(w_{i-n+1}, \ldots, w_{i-2}, w_{i-1}, w_i)/C_n}{C(w_{i-n+1}, \ldots, w_{i-2}, w_{i-1})/C_{n-1}}$$
$$= \frac{C(w_{i-n+1}, \ldots, w_{i-2}, w_{i-1}, w_i)}{C(w_{i-n+1}, \ldots, w_{i-2}, w_{i-1})} * C;$$

wherein Pr represents the probability;

wherein user navigation to the plurality of networked content pieces is represented as $w_1, w_2, \Lambda, w_i, \Lambda, w_L$, where $w_i$ is the ith visited content piece in the sequence; and wherein $C(w_{i-n+1}, \ldots, w_{i-2}, w_{i-1} w_i)$ denotes the count of an n-Gram $(w_{i-n+1}, \ldots, w_{i-2}, w_{i-1}, w_i)$ appearing in training data, $C_n$ is a total number of the n-grams, $C_{n-1}$ is a total number of the (n−1)-grams, C equals to $C_n/C_{n-1}$, $C_n$, $C_{n-}$, and C are constants.

11. The computer-readable medium of claim 10, wherein a content piece of the sequence comprises a Web page.

12. The computer-readable medium of claim 10, wherein predicting the globally optimized navigation path is dynamically performed responsive to user Web navigation.

13. The computer-readable medium of claim 10, wherein the portion comprises a session of user access to particular ones of the networked content pieces.

14. The computer-readable medium of claim 10, wherein the history further comprises a, URL, a hyperlink, a user name, a start time, text corresponding to a URL, a query, elapsed time, or an object name.

15. The computer-readable medium of claim 10, wherein the globally optimized navigation path is based on the following:

$$\operatorname*{argmax}_{w_i} \prod_{i=k+1}^{\infty} Pr(w_i \mid w_{i-2} w_{i-1}); \text{ and,}$$

wherein k represents a number of networked content pieces that the user has already visited.

16. The computer-readable medium of claim 10, wherein the globally optimized navigation path is based on the following:

$$\frac{1}{t} \sum_{i=k+1}^{i=k+t} \log(Pr(w_i \mid w_{i-2} w_{i-1}));$$

wherein k represents a number of networked content pieces that the user has already visited; and wherein t indicates how many steps are predicted.

17. The computer-readable medium of claim 16 further comprising instructions for dynamically determining how many steps to the optimal information goal are to be predicted by employing a perplexity that reflects the entropy of the globally optimized navigation path.

18. The computer-readable medium of claim 16, wherein the optimal information goal is determined according to the following:

$$\operatorname*{argmax}_{t} \frac{1}{t} \sum_{i=k+1}^{i=k+t} \log(Pr(w_i \mid w_i - 2w_{i-1})).$$

19. A computing device for modeling a user intention during network navigation, the computing device comprising:

a processor; and a memory coupled to the processor, the memory comprising computer-executable instructions that are fetched and executed by the processor for:

predicting, based on a statistical multi-step n-gram probability model, an optimal information goal of the user, the optimal information goal being based on a sequence of previously visited network content pieces and a globally optimized navigation path trough the sequence, the optimal information goal being predicted as follows:

recording a history of user action, the history comprising information corresponding to user navigation to a plurality of networked content pieces, the information indicating at least the sequence of previously visited network content pieces;

for at least a portion of the sequence data, calculating respective probabilities that a user would visit a particular content piece n in the sequence from a content piece n−1 in the sequence, a prediction of the optimal information goal being based on the respective probabilities, the calculating comprising:

$$Pr(w_i \mid w_1, \Lambda, w_{i-1}) \approx Pr(w_i \mid w_{i-n+1}, \ldots, w_{i-2}, w_{i-1})$$
$$= \frac{Pr(w_{i-n+1}, \ldots, w_{i-2}, w_{i-1}, w_i)}{Pr(w_{i-n+1}, \ldots, w_{i-2}, w_{i-1})}$$
$$= \frac{C(w_{i-n+1}, \ldots, w_{i-2}, w_{i-1}, w_i)/C_n}{C(w_{i-n+1}, \ldots, w_{i-2}, w_{i-1})/C_{n-1}}$$
$$= \frac{C(w_{i-n+1}, \ldots, w_{i-2}, w_{i-1}, w_i)}{C(w_{i-n+1}, \ldots, w_{i-2}, w_{i-1})} * C;$$

wherein Pr represents the probability;

wherein user navigation to the plurality of networked content pieces is represented as $w_1$, $w_2$, $\Lambda$, $w_i$, $\Lambda$, $w_L$, where $w_i$ is the ith visited content piece in the sequence; and wherein $C(w_{i-n+1}, \ldots, w_{i-2}, w_{i-1}, w_i)$ denotes the count of an n-Gram $(w_{i-n+1}, \ldots, w_{i-2}, w_{i-1}, w_i)$ appearing in training data, $C_n$ is a total number of the n-grams, $C_{n-1}$ is a total number of the (n−1)-grams, C equals to $C_n/C_{n-1}$, $C_n$, $C_{n-}$, and C are constants.

20. The computing device of claim 19, wherein a content piece of the sequence comprises a Web page.

21. The computing device of claim 19, wherein predicting the globally optimized navigation path is dynamically performed responsive to user Web navigation.

22. The computing device of claim 19, wherein the portion comprises a session of user access to particular ones of the networked content pieces.

23. The computing device of claim 19, wherein the history further comprises a URL, a hyperlink, a user name, a start time, text corresponding to a URL, a query, elapsed time, or an object name.

24. The computing device of claim 19, wherein the globally optimized navigation path is based on the following:

$$\operatorname*{argmax}_{w_i} \prod_{i=k+1}^{\infty} Pr(w_i \mid w_{i-2} w_{i-1}); \text{ and,}$$

wherein k represents a number of networked content pieces that the user has already visited.

25. The computing device of claim 19, wherein the globally optimized navigation path is based on the following:

$$\frac{1}{t} \sum_{i=k+1}^{i=k+t} \log(Pr(w_i \mid w_i - 2w_{i-1}));$$

wherein k represents a number of networked content pieces that the user has already visited; and wherein t indicates how many steps are predicted.

26. computing device of claim 25, further comprising instructions for dynamically determining how many steps to the optimal information goal are to be predicted by employing a perplexity that reflects the entropy of the globally optimized navigation path.

27. computing device of claim 25, wherein the optimal information goal is determined according to the following:

$$\operatorname*{argmax}_{t} (\frac{1}{t} \sum_{i=k+1}^{i=k+t} \log(Pr(w_i \mid w_i - 2w_{i-1})).$$

28. A computer device for modeling a user intention during network navigation, the computing device comprising processing means for:

predicting, based on a statistical multi-step n-gram probability model, an optimal information goal of the user, the optimal information goal being based on a sequence of previously visited network content pieces and a globally optimized navigation path through the sequence, the optimal information goal being predicted as follows:

recording a history of user action, the history comprising information corresponding to user navigation to a plurality of networked content pieces, the information indicating at least the sequence of previously visited network content pieces;

for at least a portion of the sequence data, calculating respective probabilities that a user would visit a particular content piece n in the sequence from a content piece n−1 in the sequence, a prediction of the optimal information goal being based on the respective probabilities, the calculating comprising:

$$Pr(w_i|w_1, \wedge, w_{i-1}) \approx Pr(w_i | w_{i-n+1}, \ldots, w_{i-2}, w_{i-1})$$

$$= \frac{Pr(w_{i-n+1}, \ldots, w_{i-2}, w_{i-1}, w_i)}{Pr(w_{i-n+1}, \ldots, w_{i-2}, w_{i-1})}$$

$$= \frac{C(w_{i-n+1}, \ldots, w_{i-2}, w_{i-1}, w_i)/C_n}{C(w_{i-n+1}, \ldots, w_{i-2}, w_{i-1})/C_{n-1}}$$

$$= \frac{C(w_{i-n+1}, \ldots, w_{i-2}, w_{i-1}, w_i)}{C(w_{i-n+1}, \ldots, w_{i-2}, w_{i-1})} * C;$$

wherein Pr represents the probability;
wherein user navigation to the plurality of networked content pieces is represented as $w_1$, $w_2$, $\wedge$, $w_i$, $\wedge$, $w_L$, where $w_i$ is the ith visited content piece in the sequence; and
wherein $C(w_{i-n+1}, \ldots, w_{i-2}, w_{i-1}, w_i)$ denotes the count of an n-Gram $(w_{i-n+1}, \ldots, w_{i-2}, w_{i-1}, w_i)$ appearing in training data, $C_n$ is a total number of the n-grams, $C_{n-1}$ is a total number of the (n−1)-grams, C equals to $C_n/C_{n-1}$, $C_n$, $C_{n-}$, and C are constants.

29. The computing device of claim 28, wherein a content piece of the sequence comprises a Web page.

30. The computing device of claim 28, wherein predicting the globally optimized navigation path is dynamically performed responsive to user Web navigation.

31. The computing device of claim 28, wherein the portion comprises a session of user access to particular ones of the networked content pieces.

32. The computing device of claim 28, wherein the history further comprises a URL, a hyperlink, a user name, a start time, text corresponding to a URL, a query, elapsed time, or an object name.

33. The computing device of claim 28, wherein the globally optimized navigation path is based on the following:

$$\operatorname*{argmax}_{w_i} \prod_{i=k+1}^{\infty} Pr(w_i | w_{i-2}w_{i-1}); \text{ and,}$$

wherein k represents a number of networked content pieces that the user has already visited.

34. The computing device of claim 28, wherein the globally optimized navigation path is based on the following:

$$\frac{1}{t}\sum_{i=k+1}^{i=k+t} \log(Pr(w_i | w_i - 2w_{i-1}));$$

wherein k represents a number of networked content pieces that the user has already visited; and
wherein t indicates how many steps are predicted.

35. The computing device of claim 34 further comprising means for dynamically determining how many steps to the optimal information goal are to be predicted by employing a perplexity that reflects the entropy of the globally optimized navigation path.

36. The computing device of claim 34, wherein the optimal information goal is determined according to the following:

$$\arg\max_t \left( \frac{1}{t} \sum_{i=k+1}^{i=k+t} \log Pr(w_i | w_{i-2}w_{i-1}) \right).$$

* * * * *